Figure 1:
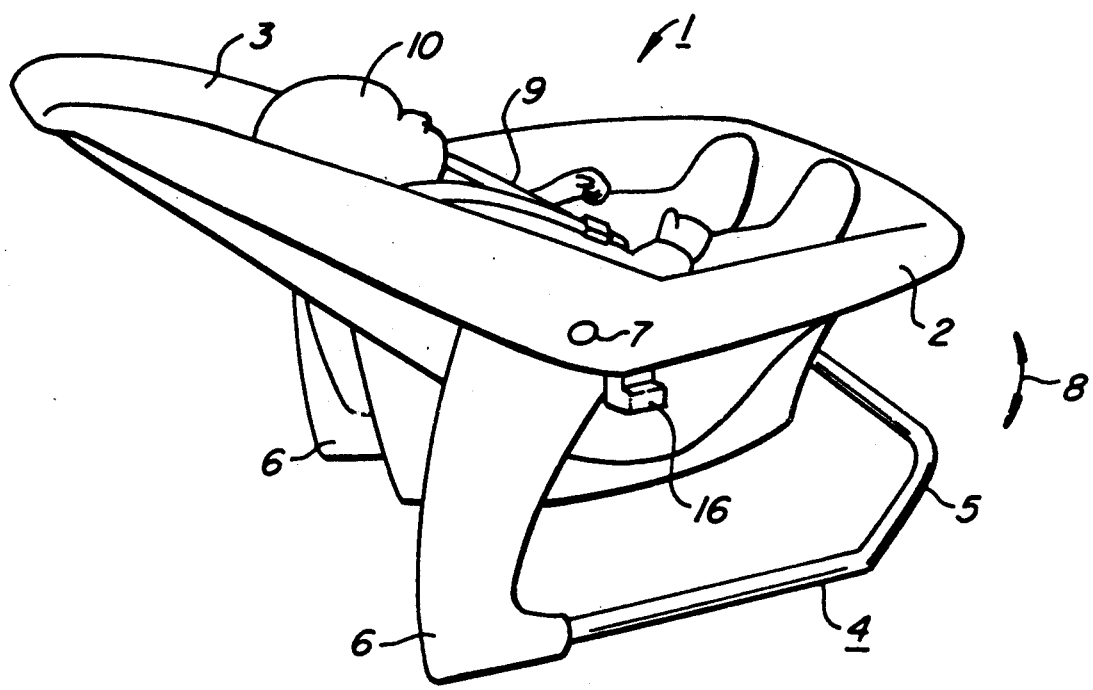

United States Patent [19]

Groenendijk

[11] Patent Number: 5,052,749
[45] Date of Patent: Oct. 1, 1991

[54] BABY SEAT

[76] Inventor: Huibert Groenendijk, Slepersvest 5-7, 3011 MK Rotterdam, Netherlands

[21] Appl. No.: 426,782

[22] Filed: Oct. 25, 1989

[30] Foreign Application Priority Data

Nov. 8, 1988 [NL] Netherlands .......................... 8802733

[51] Int. Cl.⁵ .............................................. A47C 1/08
[52] U.S. Cl. ..................................... 297/250; 297/325
[58] Field of Search ................ 297/250, 257, 183, 216, 297/483, 130, 325

[56] References Cited

U.S. PATENT DOCUMENTS

| | | | |
|---|---|---|---|
| 4,186,962 | 2/1980 | Meeker | 297/250 |
| 4,231,612 | 11/1980 | Meeker | 297/250 |
| 4,348,048 | 9/1982 | Théenot | 297/280 |
| 4,371,206 | 2/1983 | Johnson, Jr. | 297/183 |
| 4,480,870 | 11/1984 | von Wimmersperg | 297/250 X |
| 4,482,187 | 11/1984 | Nagashima et al. | 297/483 X |
| 4,500,133 | 2/1985 | Nakao et al. | 297/250 X |
| 4,707,024 | 11/1987 | Schräder | 297/216 X |
| 4,709,960 | 12/1987 | Launes | 297/250 |
| 4,730,875 | 3/1988 | Yoshitsugu | 297/481 X |
| 4,913,490 | 4/1990 | Takahashi et al. | 297/250 |

FOREIGN PATENT DOCUMENTS

| | | | |
|---|---|---|---|
| 164909 | 12/1985 | European Pat. Off. | 297/250 |
| 2347010 | 11/1976 | France | 297/250 |
| 2554336 | 5/1985 | France . | |

Primary Examiner—Jose V. Chen
Attorney, Agent, or Firm—Majestic, Parsons, Siebert & Hsue

[57] ABSTRACT

Baby seat having a seat part and a back part, the baby seat being provided with a support which can be put in at least four positions with a first underlying position, in which the baby seat can rest with its support on an underlying supporting surface in the sleeping position, with a second underlying position, in which the baby seat can rest with its support on an underlying supporting surface in the sitting position, with a third lateral position, in which the baby seat can rest with its support against a lateral supporting surface, located opposite the back part, during transport, and with a fourth lateral position, in which the baby seat can be carried by hand, by the structure of the support.

7 Claims, 3 Drawing Sheets

BABY SEAT

The invention relates to a baby seat having a seat part and a back part, said baby seat being provided with a supporting means which can be put in several positions, at least for supporting the baby seat on/against a supporting surface.

Such a baby seat is known from the European Patent Application having publication number 0,218,444. This known baby seat, which can for example be used as a rocking baby seat or as a car baby seat, contains a supporting means in the shape of a pivotable "rocker" mechanism. Said pivotable "rocker" mechanism supports the known baby seat, when said baby seat rests on an underlying supporting surface, e.g. the ground, or against a lateral supporting surface, e.g. the back of a car seat.

A drawback of the known baby seat is that the pivotable "rocker" mechanism does not offer sufficient support in practice, so that said baby seat is mostly supported on a supporting surface in an unstable, (wobbly) manner. A further drawback is that the known baby seat does not have a so-called sleeping position, i.e. a substantially horizontal position of the back part. Another drawback is, moreover, that the known baby seat used as a car seat is flung against the back of a car seat in case of e.g. a collision from the rear; indeed, in more and more countries it is becoming a mandatory safety precaution to place the baby seat on a car seat in such a manner that the back part of said baby seat is located opposite the back of the car seat. A final drawback of the known baby seat is that a separate grip for carrying the baby seat is provided, which entails extra production costs. Such a separate grip results in a rather complicated use of the baby seat.

The object of the invention is to provide a stable baby seat without a separate grip, which baby seat can be put in a sleeping position and which cannot be flung against the back of a car seat in case of, e.g. a collision from the rear.

In order to accomplish that objective a baby seat of the kind mentioned in the preamble is characterized in that the supporting means can be put in at least four positions with a first underlying position, in which the baby seat can rest with its supporting means on an underlying supporting surface in the sleeping position, with a second underlying position, in which the baby seat can rest with its supporting means on an underlying supporting surface in the sitting position, with a third lateral position, in which the baby seat can rest with its supporting means against a lateral supporting surface, located opposite the back part; during transport, and with a fourth lateral position, in which the baby seat can be carried by hand, by means of the supporting means.

One embodiment of a baby seat according to the invention is characterized in that the supporting means can be locked in at least one of the at least four positions. A further embodiment of a baby seat according to the invention is characterized in that the supporting means contains at least two mutually connected arms which are each connected to the baby seat, at a longitudinal side, in such a manner that the supporting means and the baby seat can be pivoted relative to each other, at least between the at least four positions. The at least two arms are preferably mutually connected by a substantially U-shaped body.

A further embodiment of a baby seat according to the invention is characterized in that the seat part is at its bottom side provided with a rocking part. The advantage of this is that the baby seat can be rocked to and fro by hand, by means of the supporting means, when the baby seat is in the third or the fourth lateral position.

A further embodiment of a baby seat according to the invention is characterized in that the back part is at its rear side provided with a means for guiding a belt. Said means preferably contains a resilient hook part, whereby in the stressed condition a shoulder belt can be inserted between the resilient hook part and the back of the baby seat, and whereby in the unstressed condition a shoulder belt can be held between the resilient hook part and the back part of the baby seat.

In this connection it is noted that the drawback of the baby seat known from the European patent application having publication number 0,218,444 is that a safety belt is passed in front of a child sitting in said baby seat which, as has become apparent in practice, may lead to serious injury to the child and has an adverse effect on the sitting comfort of the child. Besides, another drawback is that the child can only be removed from the said baby seat in a very laborious manner and that this mode of attachment requires a very long safety belt, which is usually not a standard accessory. In any event, with the baby seat according to the invention a short, standard safety belt will suffice, as the lap belt is passed under the seat part of the baby seat.

A further embodiment of a baby seat according to the invention is characterized in that in the third position a space present between the supporting means and the seat part is suitable for guiding a belt.

Figure 1A:
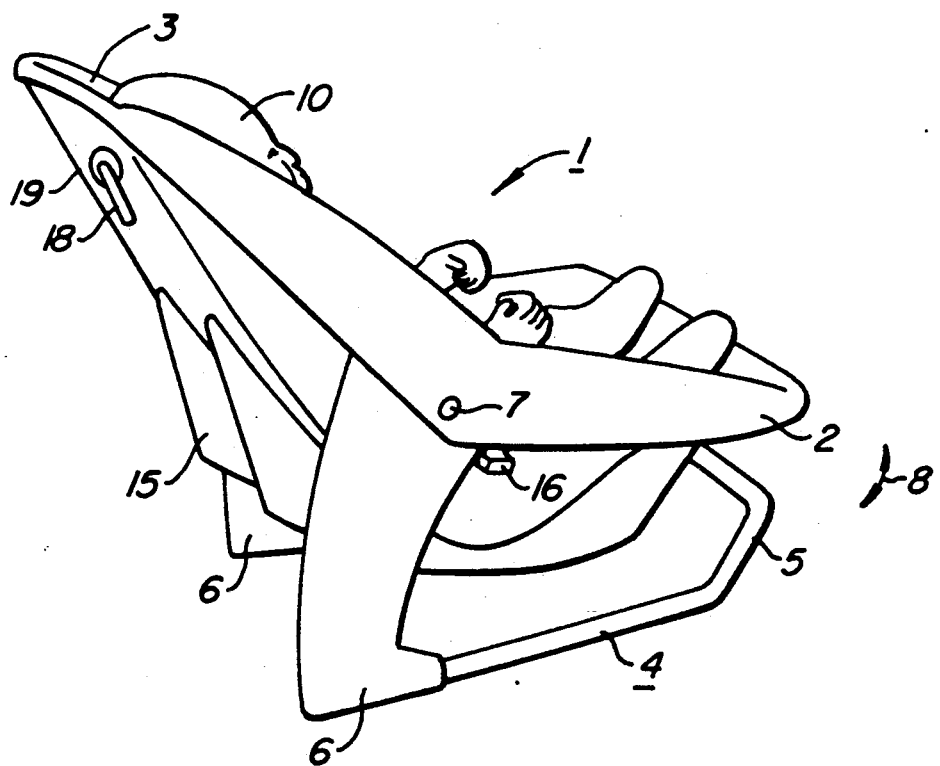
Figure 2:
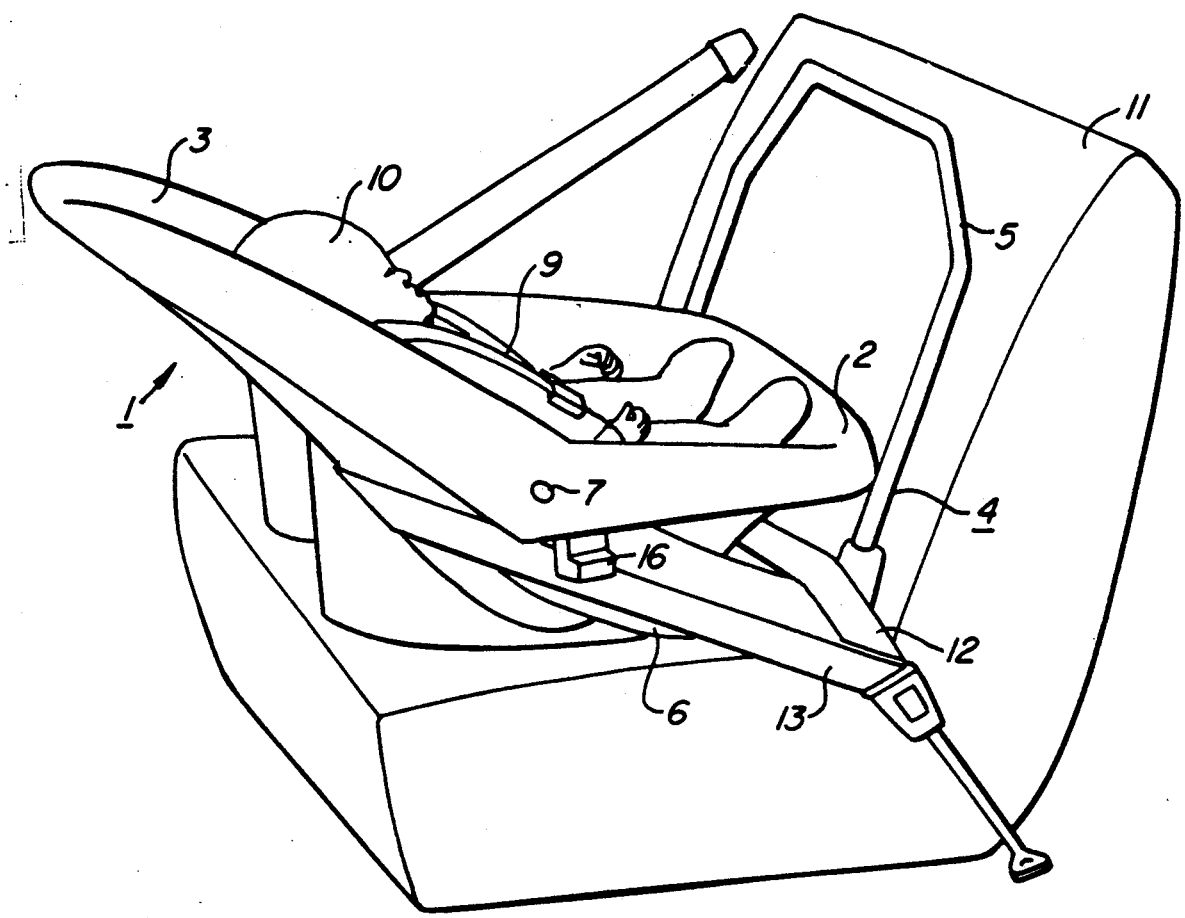
Figure 3:
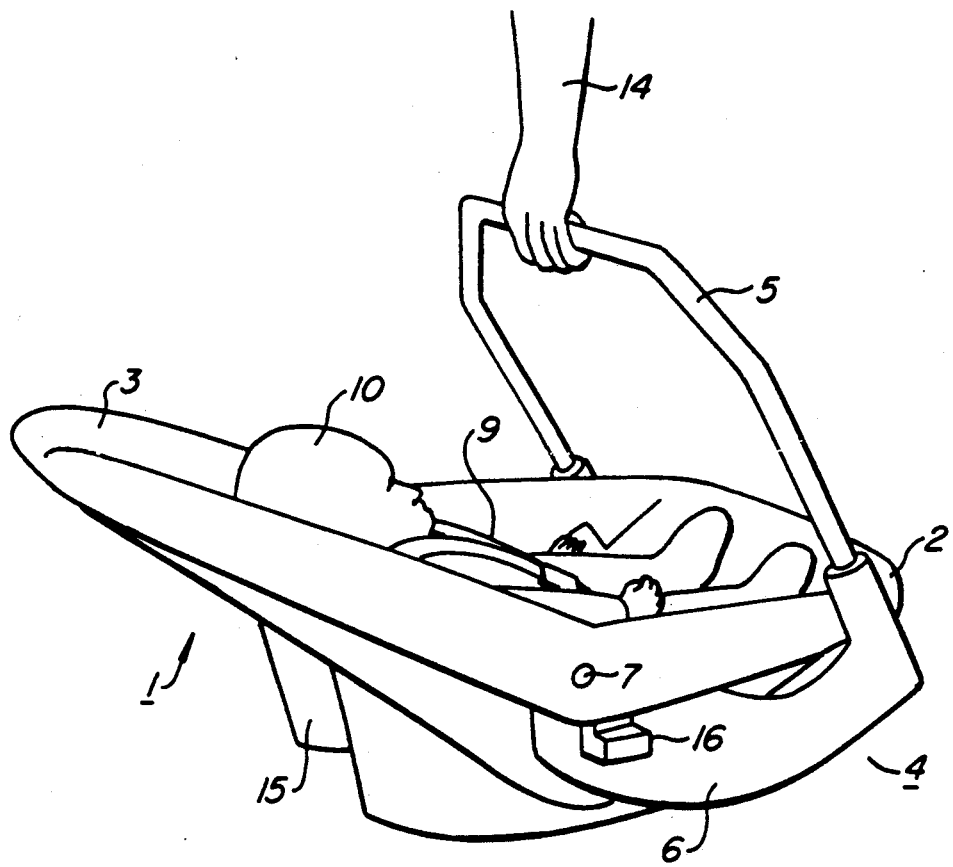
Figure 4:
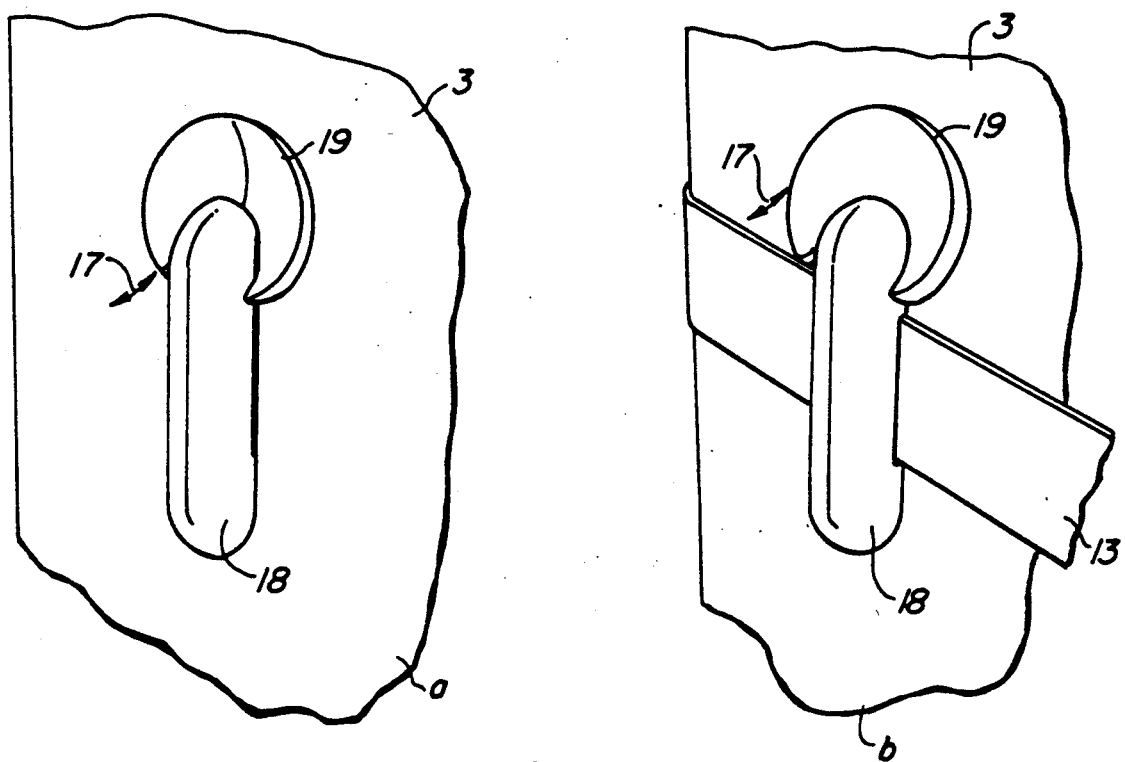

The invention will be further explained with reference to figures illustrated in the accompanying drawing, wherein FIG. 1 shows a baby seat according to the invention, said baby seat resting with its supporting means in the sleeping position, FIG. 1A shows a baby seat according to the invention, said baby seat resting with its supporting means on the ground in the sitting position, FIG. 2 shows a baby seat according to the invention, said baby seat being located in a car, resting with its supporting means against a back of a car seat, FIG. 3 shows a baby seat according to the invention, said baby seat being carried by hand, by means of the supporting means, and FIG. 4 shows a means for guiding a safety belt, said means being provided at the rear side of the back part of a baby seat according to the invention.

In FIG. 1 a baby seat 1 according to the invention, having a seat part 2 and a back part 3, can be distinguished, said baby seat 1 being provided with a support 4 in the shape of a brace. Said support 4 contains two arms 6, which are connected by a substantially U-shaped body 5, said arms 6 each being connected to one longitudinal side of the baby seat 1, in such a manner that the support 4 and the baby seat 1 can be pivoted relative to each other about a pivoting point 7, in the direction of the arrows 8. In FIG. 1A support 4 is in a second underlying position here, in which position the baby seat 1 rests with its support 4 on the ground in the sitting position. Referring now to FIG. 1 support 4 is shown in a first underlying position, in which the baby seat 1 rests with its support 4 on the ground in the sleeping position, i.e. in a substantially horizontal position of the back part 3. In the baby seat 1 there is shown a baby 10 strapped by means of a belt 9.

FIG. 2 illustrates the baby seat 1 of FIG. 1, whereby the support 4 is in a third lateral position. The support 4 rests against a back 11 of a car seat here. As has already been explained, it is now impossible for the baby seat 1 to be flung against the back 11 in case of a collision, especially in case of a collision from the rear. A space present between the support 4 and the seat part 2 is used for guiding a lap belt 12 therealong. A shoulder belt 13 is guided behind the back part 3, which will be explained with reference to FIG. 4.

FIG. 3 illustrates the baby seat 1 of FIG. 1, whereby the support 4 is in the fourth lateral position. As a result it is possible to carry the baby seat 1 by hand 14, by means of the support 4. The seat part 2 is provided with a rocking part 15 at its bottom side here, so that it is also possible to rock the baby seat 1 to and fro by hand 14, by means of the support 4. Furthermore there is provided a locking handle 16, by means of which the support 4 can be locked in the various positions, and be unlocked again.

FIG. 4 shows a means for guiding a shoulder belt 13, said means being provided at the rear side of the back part 3. Said means contains a hook part 18, springing in the direction of the arrows 17, and a guide disc 19, whereby in the stressed condition (a) the shoulder belt 13 can be inserted between the resilient hook part 18 and the back part 3, and whereby in the unstressed condition (b) the shoulder belt 13, inserted between the resilient hook part 18 and the back part 3, can be held.

What is claimed is:

1. Baby seat having a seat part defining a top and a bottom and a back part defining a front and a rear, said baby seat further defining underlying positions under the bottom of said seat part and lateral positions in front of said back part and being provided with a supporting means which can be put in several positions, at least for supporting the baby seat on/against a supporting surface, characterized in that the supporting means contains at least two arms being mutually connected by a substantially U-shaped body, said arms each being connected to the baby seat, at a longitudinal side, in such a manner that the supporting means and the baby seat can be pivoted relative to each other, at least between four positions, with a first underlying position, in which the baby seat can rest with its supporting means on an underlying supporting surface in a sleeping position wherein said back part is substantially horizontal, with a second underlying position, in which the baby seat can rest with its supporting means on an underlying supporting surface in a sitting position wherein said back part is elevated from said substantially horizontal sleeping position, with a third lateral position, in which the baby seat can rest with its supporting means against a lateral supporting surface, located in front of the back part, during transport, and with a fourth lateral position, in which the baby seat can be carried by hand, by means of the substantially U-shaped arms of the supporting means being positioned above the seat part.

2. Baby seat according to claim 1, further including locking means whereby the supporting means can be locked in at least one position of said four positions.

3. Baby seat according to claim 1, characterized in that the seat part is at its bottom side provided with a means for rocking the baby seat.

4. Baby seat according to claim 1, characterized in that the back part is at its rear side provided with a means for guiding a belt.

5. Baby seat according to claim 4, characterized in that the means preferably contains a resilient hook part, whereby a shoulder belt can be inserted between the resilient hook part and the back part of the baby seat, and held between the resilient hook part and the back part.

6. Baby seat according to claim 1, characterized in that in the third position a space, present between the supporting means and the seat part, is suitable for guiding a belt.

7. Baby seat according to claim 1, characterized in that the at least two arms are substantially perpendicular to said substantially U-shaped body.

* * * * *